United States Patent
Meek

(10) Patent No.: US 12,463,677 B2
(45) Date of Patent: Nov. 4, 2025

(54) SWIVEL PHONE HOLDER

(71) Applicant: Aaron Meek, La Cygne, KS (US)

(72) Inventor: Aaron Meek, La Cygne, KS (US)

(*) Notice: Subject to any disclaimer, the term of this patent is extended or adjusted under 35 U.S.C. 154(b) by 396 days.

(21) Appl. No.: 17/507,260

(22) Filed: Oct. 21, 2021

(65) Prior Publication Data
US 2023/0128749 A1  Apr. 27, 2023

(51) Int. Cl.
*H04B 1/3877* (2015.01)
*A45F 5/00* (2006.01)
*F16M 11/14* (2006.01)

(52) U.S. Cl.
CPC .......... *H04B 1/3877* (2013.01); *A45F 5/00* (2013.01); *F16M 11/14* (2013.01); *A45F 5/1516* (2025.01)

(58) Field of Classification Search
CPC ......... H04B 1/3877; H04B 1/385; A45F 5/00; A45F 2200/0516; A45F 2005/006; F16M 11/14; F16M 2200/068; F16M 11/2014; F16M 11/2028; F16M 11/2085; F16M 13/04
USPC ...................................................... 455/575.1
See application file for complete search history.

(56) References Cited

U.S. PATENT DOCUMENTS

| | | | | |
|---|---|---|---|---|
| 3,714,668 A | * | 2/1973 | Mirabella | A42B 3/145 2/419 |
| 3,824,022 A | * | 7/1974 | Mancino | B43L 15/00 401/6 |
| 4,354,283 A | * | 10/1982 | Gooding | A42B 3/14 2/413 |
| 5,456,703 A | * | 10/1995 | Beeuwkes, III | A61F 11/06 607/114 |
| 2009/0272866 A1 | * | 11/2009 | Solomovitz Brief | F16M 11/14 248/276.1 |
| 2012/0002046 A1 | * | 1/2012 | Rapoport | G02B 27/0176 348/E7.091 |
| 2012/0281429 A1 | * | 11/2012 | Orozco | A61B 1/0692 2/209.13 |

* cited by examiner

*Primary Examiner* — Eugene Yun
(74) *Attorney, Agent, or Firm* — Lyman Moulton, Esq.; Moulton Patents, PLLC

(57) ABSTRACT

The Swivel Phone Holder provides users with a head-mounted phone holder by placing the cellular device directly in front of a user's face. This ensures their head and neck remain in an upright position. The headband comfortably locks down around the base of the head, and can be easily adjusted to change the distance and positioning of the connected device through the bendable arm and sliding clip to ensure the phone is securely placed in a comfortable position at all times. The disclosed invention allows the device to swivel and move, thus giving users the ability to multitask and perform other tasks hands-free. The disclosed invention ensures users are able to use their phones while keeping their head and neck in a more natural position to allow for a safer and more convenient phone using experience.

12 Claims, 1 Drawing Sheet

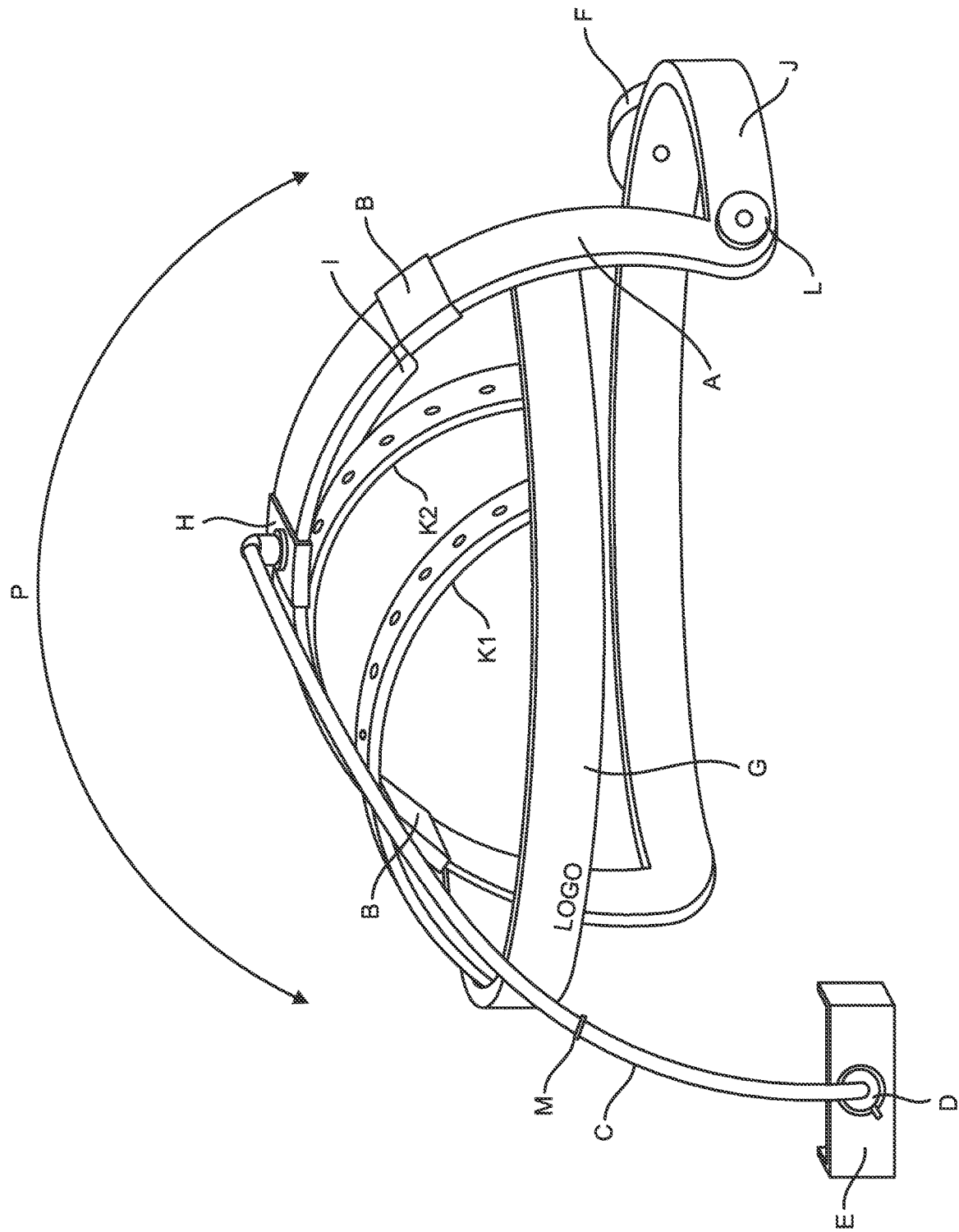

SWIVEL PHONE HOLDER

BACKGROUND

Indications are that the prevalence of upper back and neck pain has increased dramatically in the decade leading up to 2016. This increase has been attributed to the corresponding widespread adoption of laptop computers, tablets, smartphones and other small portable digital devices. iHunch, also called iPosture, forward head posture, poking chin posture, wearsie neck, computer neck, upper crossed syndrome, text neck, and dowager's hump, is the common spinal problem of an excessively kyphotic (hunched) thoracic spine driving neck pain and cervicogenic headache. It is clinically recognized as a form of repetitive strain injury. The term text neck was first coined by Dr. Dean L. Fishman, a US chiropractor.

Computer vision syndrome (CVS) is a condition resulting from focusing the eyes on a computer or other display device for protracted, uninterrupted periods of time and the eye's muscles being unable to recover from the constant tension required to maintain focus on a close object. Some symptoms of CVS include headaches, blurred vision, neck pain, fatigue, eye strain, dry eyes, irritated eyes, double vision, vertigo/dizziness, polyopia, and difficulty refocusing the eyes. These symptoms can be further aggravated by improper lighting conditions (i.e. glare, strong blue-spectrum backlights, or bright overhead lighting) or air moving past the eyes (e.g. overhead vents, direct air from a fan).

SUMMARY OF THE INVENTION

The main purpose of the Swivel Phone Holder is to provide users with a head-mounted phone holder. The neck-bending motion associated with using a cellphone places a great deal of extra stress on the cervical spine, thus increasing the likelihood of neck and back discomfort, which could potentially lead to long-term health consequences.

The Swivel Phone Holder places the cellular device directly in front of a user's face to ensure their head and neck remain in an upright position to eliminate any discomfort that would otherwise occur from looking down at the device. Expanding on the initial design of an average headband, the Swivel Phone Holder introduces a novel headgear piece that fits over the user's head and comfortably locks down around the frontal and occipital lobes of the skull or base of the head. The headband can be easily adjusted to change the distance and positioning of the connected device through the bendable arm and sliding clip to ensure the phone is securely placed in a comfortable position at all times. With its strategic design, this innovative product allows the device to swivel and move from the center, to the right, or left of the face, thus giving users the ability to multitask and perform other tasks hands-free. The Swivel Phone Holder ensures users are able to use their phones while keeping their head and neck in a more natural position to allow for a safer and more convenient phone using experience. This unprecedented product guarantees a fully operational phone holding apparatus that eliminates the neck and back strain that is normally associated with typical phone usage, and improves the users posture.

BRIEF DESCRIPTION OF THE DRAWINGS

FIG. 1 is a perspective view of the Swivel Phone Holder headband invention, in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a perspective view of the Swivel Phone Holder headband invention, in accordance with an embodiment of the present disclosure. Reference A depicts the parietal headband. Reference B depicts the slide snaps to adjust the fitting of the device. Reference C depicts the bendable and extendable arm. Reference D depicts the ball joint, which can swivel the connected device and includes a locking mechanism. Reference E depicts the phone holder. Reference F depicts the snap tightener, which is also used to adjust the fitting of the device. Reference G depicts the frontal lobe head piece. Reference H depicts the swivel sliding clip, which has a thirty-degree swivel and can lock in place. Reference I depicts foam padding on the inside of the headband. Reference J depicts the occipital lobe head piece and K1 and K2 depict the parietal lobe supports straps. Reference L depicts the temporal hinge and reference M depicts the bendable arm C length extension joint. Arrow P illustrates the direction back and forth that the swivel sliding clip moves on headband A.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A phone holder comprising:
   a mechanical arm having a first end and a second end;
   a swivel sliding clip configured with a thirty-degree swivel to receive the first end of the arm;
   a ball joint configured to receive the second end of the arm and to attach to a phone holder;
   a head gear comprising a frontal headband interconnected to a parietal headband and the parietal headband interconnected to an occipital headband at temporal interconnects on each side of the head gear, wherein the parietal headband is configured to slidably receive the swivel sliding clip between the temporal interconnects; and a first and a second parietal support strap adjustably connected at both respective ends to the frontal headband.

2. The phone holder of claim 1, wherein the mechanical arm is bendable.

3. The phone holder of claim 1, wherein the parietal headband and the occipital headband are interconnected at a right temporal hinge and a left temporal hinge.

4. The phone holder of claim 1, wherein the frontal headband is adjustably connected at both ends to the parietal headband.

5. The phone holder of claim 1, further comprising a mechanical arm extension joint configured to extend a reach of the mechanical arm.

6. The phone holder of claim 1, further a phone holder bracket configured to receive the ball joint and swivel thereon.

7. The phone holder of claim 1, further comprising a snap tightener configured to tighten the occipital headband by ratchet sliding midsection ends by each other.

8. The phone holder of claim 1, further comprising slide straps which tighten the parietal headband by ratchet sliding midsection ends by each other.

9. The phone holder of claim 1, wherein the thirty-degree swivel of the swivel sliding clip comprises an up and down movement relative to the frontal headband based on the swivel sliding clip slideably received proximal the temporal interconnect.

10. The phone holder of claim 1, further comprising a foam padding on an inside surface of the occipital headband.

11. The phone holder of claim 1, further comprising a foam padding on an inside surface of the frontal headband.

12. The phone holder of claim 1, further comprising a locking ring between the ball joint and a phone holder bracket.

* * * * *